(12) United States Patent
Kwon et al.

(10) Patent No.: US 6,694,215 B1
(45) Date of Patent: Feb. 17, 2004

(54) DEVICE FOR LOADING/UNLOADING CARGO AND METHOD THEREFOR

(76) Inventors: Youngsoo Kwon, Dong-A University, 840, Hadan-dong, Saha-gu, Pusan (KR), 604-714; Kyonghan Kim, 430-4, Daejeo-1dong, Kangseo-gu, Pusan (KR), 618-141

( * ) Notice: Subject to any disclaimer, the term of this patent is extended or adjusted under 35 U.S.C. 154(b) by 0 days.

(21) Appl. No.: 10/148,795

(22) PCT Filed: Dec. 20, 1999

(86) PCT No.: PCT/KR99/00792

§ 371 (c)(1),
(2), (4) Date: Jun. 4, 2002

(87) PCT Pub. No.: WO01/46061

PCT Pub. Date: Jun. 28, 2001

(51) Int. Cl.[7] .................................................. G06F 7/00
(52) U.S. Cl. ........................................ 700/213; 700/226
(58) Field of Search ................................ 700/213, 214, 700/225, 226; 414/141.3, 140.3, 786; 198/853

(56) References Cited

U.S. PATENT DOCUMENTS

| | | | | |
|---|---|---|---|---|
| 4,136,789 A | * | 1/1979 | Mulock Houwer | 414/797.1 |
| 4,160,617 A | * | 7/1979 | Montgomery et al. | 414/141.3 |
| 5,303,818 A | * | 4/1994 | Gruettner et al. | 198/853 |
| 5,505,585 A | * | 4/1996 | Hubbard | 414/803 |
| 5,511,923 A | * | 4/1996 | Dunstan | 414/139.9 |
| 5,718,550 A | * | 2/1998 | Lanigan et al. | 414/140.3 |
| 5,775,866 A | * | 7/1998 | Tax et al. | 414/140.3 |
| 5,951,226 A | * | 9/1999 | Fantuzzi | 414/141.3 |

* cited by examiner

Primary Examiner—Gene O Crawford
(74) Attorney, Agent, or Firm—Notaro & Michalos P.C.

(57) ABSTRACT

A system and method for reducing time delays while loading and unloading a cargo ship includes scanning and using an identifier to determine content and destination information for a cargo container, using a trolley crane and spreader to move the container between a ship and an elevator, and loading and unloading containers between a horizontal conveyor and a trailer with an orthogonal coordinates crane. The container is moved up and down on the elevator between the trolley crane and spreader and the horizontal conveyor. The horizontal conveyor moves the container between the elevator and an orthogonal coordinates crane and spreader. The two cranes move the container more efficiently and rapidly, and the system permits some loading and unloading to occur in the absence of the cargo ship or trailer. The elevator and conveyor move the containers more quickly than a trolley crane alone, and can be automated.

6 Claims, 10 Drawing Sheets

DEVICE FOR LOADING/UNLOADING CARGO AND METHOD THEREFOR

BACKGROUND OF THE INVENTION

1. Field of the Invention

The present invention relates to a device for loading a cargo from a ship at anchor to a trailer or from the trailer to the ship at anchor and more particularly, a device for loading/unloading the cargo, the device capable of rapidly and exactly moving a container at a regular position of a board and an yard with receiving all information necessary in the harbour when a crane grips the container by dividing the loading/unloading work of the cargo into the ship and the trailer.

2. Description of the Related Art

Typically, a gantry crane for loading/unloading of a container has been well-known as one of main anchor instruments. The gantry crane corresponds to a device for with power, installing the container as an instrument made with a given standard and for loading a large-sized cargo, and moving a given distance.

Figure 1:
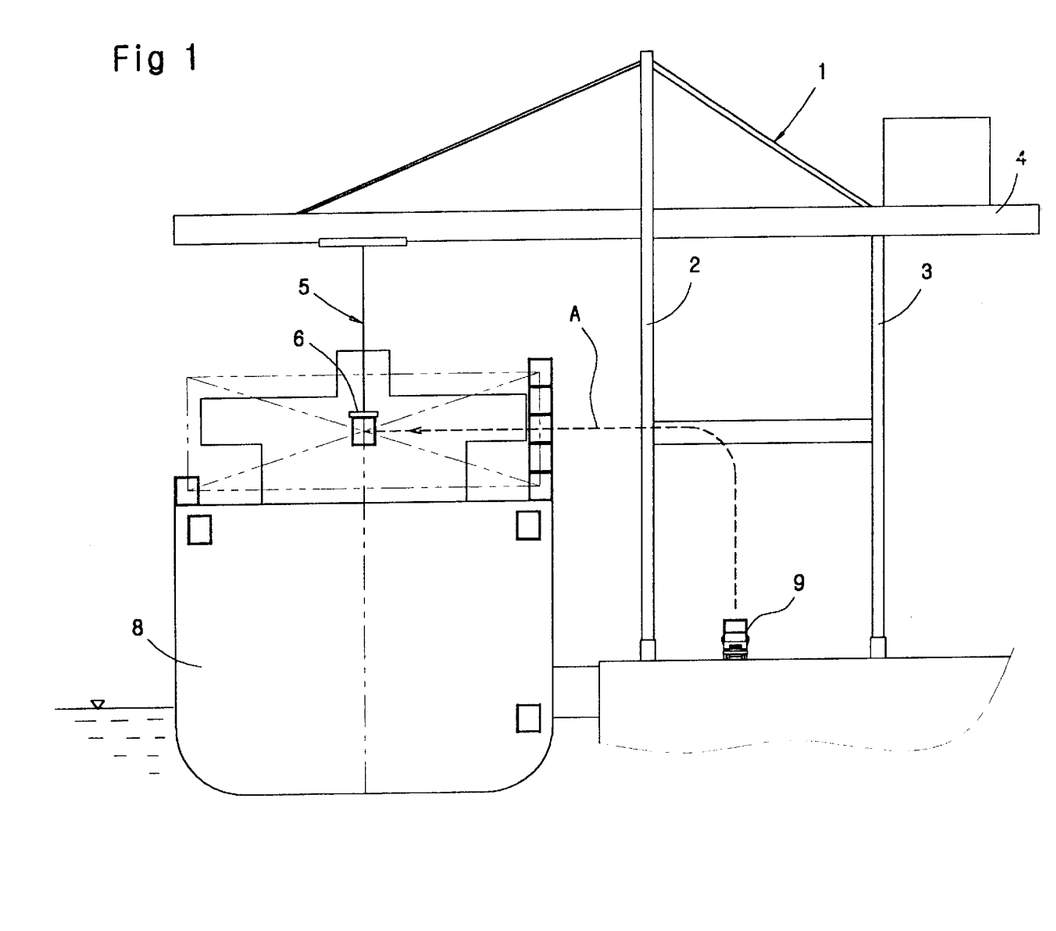
FIG. 1 is a schematic view showing the construction of a gantry crane depicted for describing a method for loading/unloading the cargo according to the prior art.

A prior art gantry crane for loading/unloading of the container is comprised of an iron frame construction 1 and a crane 5, as depicted in FIG. 1 as a schematic view showing the construction of a gantry crane depicted for describing a method for loading/unloading the cargo according to the prior art.

The iron frame construction 1 is included with posts 2 and 3 stood upright on the ground a guide rail 4 installed vertically depending on these posts 2 and 3. Also, the crane 5 moves along the guide rail 4 of the iron frame construction 1 and controls 2-axises movement including a direction rectangular to the guide rail 4, simultaneously. The crane 5 is constructed with a spreader 6 for picking the container 7, a winch and an operating room as not shown in figures.

For loading/unloading of the container, the crane 5 moves to a position of the ship 8 at anchor, discharges the spreader 6 at the moved position, lifts one of containers 7 loaded in the ship 8, moves to a position of the trailer 9 with the container 7 lifted along the guide rail 4, and softly unloads the container 7 above the trailer 9. Following that, the crane 5 again wounds the spreader 6 and returns to the ship position in order to repeat the unloading work of next containers. During the crane 5 returns toward the ship 8, the trailer 9 loaded with the container 7 leaves the position, a next trailer comes into the position and awaits. By repeating the above works, the unloading work of the containers 7 loaded in the ship 8 are performed. The loading work of the container is performed in the contrary order of the aforementioned unloading works. For reference, the moving course of A in FIG. 1 corresponds to the course upon the loading and the course upon the unloading and the spreader 6 moves along the above course.

As stated above, according to the prior art, the spreader 6 returns the overall blocks of the moving course A with one crane 5, as illustrated in FIG. 1. However, since the distance between the ship 8 and the trailer 9 is long and the moving speed of the crane 5 is slow, it takes much times to return the overall blocks at one time.

Accordingly, in the prior art, it naturally takes much time to load or unload the container at the ship to the trailer as well as there is frequently generated the case that other works is stopped and awaited until the work preparation is completed upon one work preparation of the ship, the trailer, a trolly, the spreader. Therefore, the gantry crane according to the prior art has the problem of deteriorating the overall loading/unloading effect of the harbors.

In the meantimes, so as to heighten the loading/unloading of the ship, it is considerable to reduce the work time with heightening the moving speed of the trolly and the spreader in the gantry crane. However, when considering the load of the container and safety for loading, there is a limit to height the moving speed of the trolly and the spreader.

BRIEF DESCRIPTION OF THE DRAWINGS

A more complete appreciation of this invention, many of the attendant advantages thereof, will be readily apparent as the same becomes better understood by reference to the following detailed description when considered in conjunction with the accompanying drawings, in which like reference symbols indicate the same or similar elements components, wherein.

SUMMARY OF THE INVENTION

It is therefore an object of the present invention for solving the above problem to provide a device for loading/unloading the cargo of a container with minimizing he moving range of a conveyor, a trolly and a spreader of a gantry crane, discriminating the ship work and the trailer work, and improving the loading/unloading effect more than that of the prior art, thereby solving the delay problem of the work time generated by awaiting the other works due to the work delay of one of a trolly, a spreader, and a trailer.

It is another object of the present invention to provide a method for loading/unloading the cargo of a container with removing the work error by adhering an orthogonal coordinates crane for easily automating the work and a sensor for reading the information necessary in a ship, to spreaders of two places when loading/unloading the container to the trailer.

These and other objects can be achieved according to the present invention with a method for loading/unloading a cargo to a yard from a ship, is included with: a conveying step of recognizing natural number, bar code, RF, and IC chip printed at the container, recognizing the property such as the kind of the cargo, the weight thereof, the designation place, and a shipper thereof, the property such as the kind of the cargo, the weight thereof, the designation place, and a shipper thereof and conveying the container to the ship for unloading or a conveying place near to the ship, at a ship cargo conveying unit; a trailer cargo conveying step of sensing the position of a trailer, falling down a spreader, recognizing the property such as the kind of the cargo, the weight thereof, the designation place, and a shipper thereof, and conveying the cargo to the trailer for automatically driving or a conveying place near to the trailer, at a trailer cargo conveying unit; and, a conveying step of conveying the cargo conveyed and loaded at the ship, from one of the conveying places near to the ship and the trailer to the other thereof, whereby delay of others can be reduced due to work delay of the ship conveying and loading place and the trailer.

Further, the present invention can be achieved with a device for loading/unloading a cargo to a yard from a ship, is included with: a conveying step of recognizing natural number, bar code, RF and IC chip printed at the container, recognizing the property such as the kind of the cargo, the weight thereof, the designation place, and a shipper thereof, the property such as the kind of the cargo, the weight thereof, the designation place, and a shipper thereof and conveying the container to the ship for unloading or a conveying place near to the ship, at a ship cargo conveying unit; a trailer cargo conveying step of sensing the position of a trailer, falling down a spreader, recognizing the property such as the kind of the cargo, the weight thereof, the designation place, and a shipper thereof, and conveying the cargo to the trailer for automatically driving or a conveying place near to the trailer, at a trailer cargo conveying unit; and, a conveying step of conveying the cargo conveyed and loaded at the ship, from one of the conveying places near to the ship and the trailer to the other thereof, whereby delay of others can be reduced due to work delay of the ship conveying and loading place and the trailer.

DETAILED DESCRIPTION OF THE PREFERRED EMBODIMENTS

Hereinafter, a preferred embodiment of the present invention will be in detail explained with reference to the accompanying drawings. Further, in the following description, the necessary description for understanding the present invention are set forth to provide a more thorough understanding of the present invention. It is noted that a detailed description of known functions and constructions unnecessarily obscuring the subject matter of the present invention has been omitted in the following description for clarity.

Here, the cargo includes not only all kinds of packages but also all standard or nonstandard cargo instrument of packing all cargoes. The container is a representative example of the standard cargo instrument. Meanwhile, the ship cargo is called as the cargo for being loaded or unloaded to/from the ship and the trailer cargo is called as the cargo for being loaded or unloaded to/from the trailer. Also, the trailer includes all power or non-power vehicles for cargo transportation.

As mentioned previously, a device for loading/unloading the cargo to the ship from the trailer or from the trailer to the ship and a method therefor according to the present invention uses more than two conveying implements divided into two, that is, the ship and the trailer, unlike one conveying implement (trolly, spreader) according to the prior art, thereby dividing the loading/unloading works of the container into the works of the ship and the trailer and respectively exercising together the works. Further, a preferred embodiment of the present invention as described above will be concretely expressed as follows with reference to the accompanying drawings.

Figure 2:
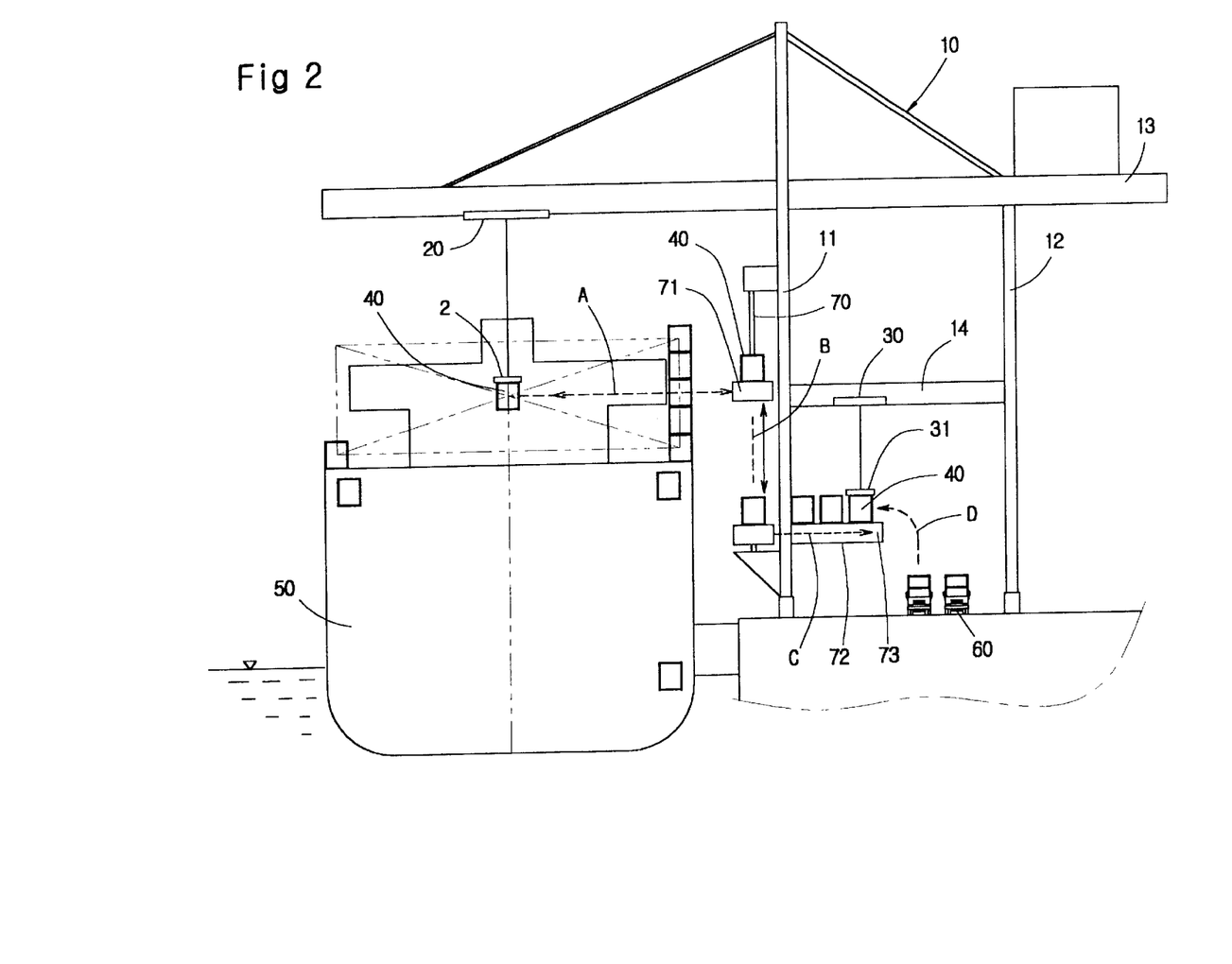
FIG. 2 is a schematic view showing the construction of the gantry crane depicted for describing a method for loading/unloading the cargo according to the present invention.

Most of all, the method for loading/unloading the cargo according to the present invention will be described with respect to FIG. 2. FIG. 2 is a schematic view showing the construction of the gantry crane depicted for describing a method for loading/unloading the cargo according to the present invention.

As an iron frame construction 10 in the gantry crane as depicted in FIG. 2 as stated hereinbefore, is constructed with posts 11 and 12 ejected upright on the ground, upper and lower guide rails 13 and 14 installed vertically and long at respective different heights depending on the posts 11 and 12, a ship cargo trolly 20, and a trailer cargo orthogonal coordinates crane 30. The trolly 20 and the orthogonal coordinates crane 30, like the prior art, has spreaders 21 and 31 for respectively lifting the container 40. In the meanwhile, conveying units 70 and 72 is are installed between the ship 50 and the trailer 60. At this point, the conveying units 70 and 72 have a conveying and loading position 71 positioned near to the ship 50 and a conveying and loading position 73 positioned near the trailer 60. Also, the conveying units 70 and 72 have a driving unit for conveying the container 40 from one portion of the conveying and loading positions 70 and 72 to the other portion thereof. As an example, the driving unit of the conveying units 70 and 72 can be embodied with combination of elevators 70 and 72a for vertical conveying and conveys 72 and 72a for horizontal conveying.

Herein, the height of the conveying and loading position 71 of the conveying unit 70 can be varied by stages depending on a cargo loading height loaded at the conveying and loading position and on size of the ship 50.

A step of conveying and loading the cargo at the ship as a first step of the present invention is comprised of loading and conveying(course A) of conveying the container 40 from the ship 50 to the conveying and loading position 71 at the ship 50 of the conveying unit 70 along a reversible course A or unloading(course A) of conveying the container 40 from the conveying and loading position 71 at the ship 50 of the conveying unit 70 to the ship 50, by using the spreader 21 and the trolly 20 for ship cargo, wherein the trolly 20 therefor is installed at the upper guide rail 13 of the iron frame construction 10 in FIG. 2 and lifts the container 40.

A step of conveying and loading the cargo at the trailer as a second step of the present invention is comprised of loading(course D) of loading the container 40 from the conveying and loading position 73 at the trailer of the conveying unit 62 to the trailer 60 along a reversible course D or unloading(course D) of unloading and conveying the container 40 from the trailer 60 to the conveying and loading position 73 at the trailer of the conveying unit 62 to the trailer 60, by using the spreader 31 and the orthogonal coordinates crane 30 for trailer cargo loading/unloading, wherein the orthogonal coordinates crane 30 is installed at the lower guide rail 14 of the iron frame construction 10 in FIG. 1.

Next, a step of conveying as a third step of the present invention is comprised of loading and conveying(courses B and C) of conveying the container 40 from the conveying and loading position 71 at the ship to the conveying and loading position 73 at the trailer along reversible courses B and C or unloading and conveying(courses C and B) of conveying the container 40 from the conveying and loading position 73 at the trailer to the conveying and loading position 71 at the ship, by the conveying units 70 and 72 installed between the ship 50 and the trailer 60 in FIG. 2.

That is, the unloading work of the container is loading, conveying the container 40 loaded at the ship 50 along the courses A, B, C, D, and unloading the container 40 to the trailer 60. The loading work of the container is loading, conveying the container 40 loaded at the trailer 60 along the courses D, C, B, A, and loading the container 40 at the ship 50.

The trolly 20 for ship cargo and spreader 21, as a need arises, can be moved along the course A depicted in FIG. 1, which is in fact equal to the prior art.

In accordance with to a method for loading/unloading the cargo according to the present invention, other works can be continuously performed in the case that the work at one of a ship cargo loading and conveying step and a trailer cargo loading and conveying step is delayed. Therefore, the work effect can be improved, the time required to wait the ship or the trailer can be reduced, and the orthogonal coordinates crane 30 and the spreader 31 for loading/unloading the container 40 at the trailer 60 can be automatized.

On the other hand, as not shown, the present invention does not use the conveying units 70 and 72 in FIG. 2, and can perform the loading/unloading work of the container through the steps of conveying and loading the container 40 from the ship 50 and the trailer 60 to the same position, and conveying the container 40 loaded there at to each trolly 20, each spreader 21, each orthogonal coordinates crane 30, each spreader 31, the ship 50, and the trailer 60, by secreting wide same position including the conveying and loading positions 71 and 73 of the conveying units 70 and 72, so that each trolly 20, each spreader 21, each orthogonal coordinates crane 30, and each spreader 31 at the ship cargo and the trailer cargo can be moved to the same position.

Thereinafter, a preferred embodiment of the gantry crane installed at the harbor as a device for loading/unloading the cargo in accordance with the present invention will be exampled and expressed concretely. In the following and accompanying drawings, the equal reference numerals are given and expressed to the equal parts of FIG. 2 for the convenience of the description.

Figure 3:
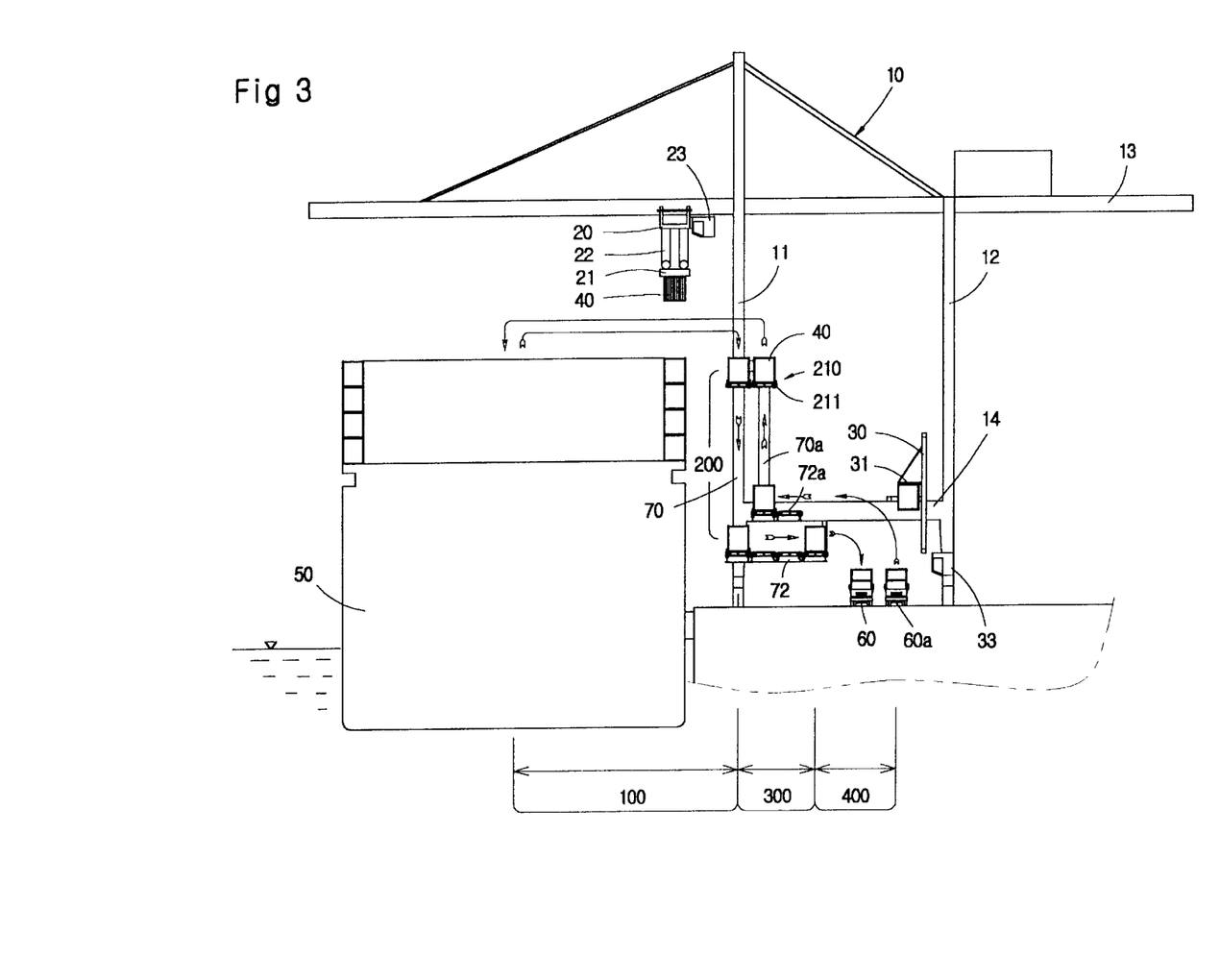
FIG. 3 is a view showing a device for loading/unloading the cargo according to a first preferred embodiment of the present invention.

The gantry crane according to a first embodiment of the present invention, as shown in FIG. 3, posts 11 and 12 as the iron frame construction 10 upright ejected on the ground, the guide rails 13 and 14 made at respective and separated height at the posts 11 and 12, a ship cargo conveying and loading unit 100 for conveying and loading the container from the ship 50, conveying units 200 and 300 for conveying the container 40 carried between the ship 50 and the trailer 60, and a trailer cargo conveying and loading unit 400 for conveying and loading the container to the trailer 60, or from the trailer 60.

The ship cargo conveying and loading unit 100 includes the upper guide rail 13 of the iron frame construction 10, and the trolly for the ship cargo supported to move the guide rail 13. Herein, the trolly 20 comprises the spreader 21 for griping the container, and a winch 22 and an operating room 23 for lifting the contained griped at the spreader 21, and controls 2-axises including the direction orthogonal to the guide rail 13.

Figure 4A:
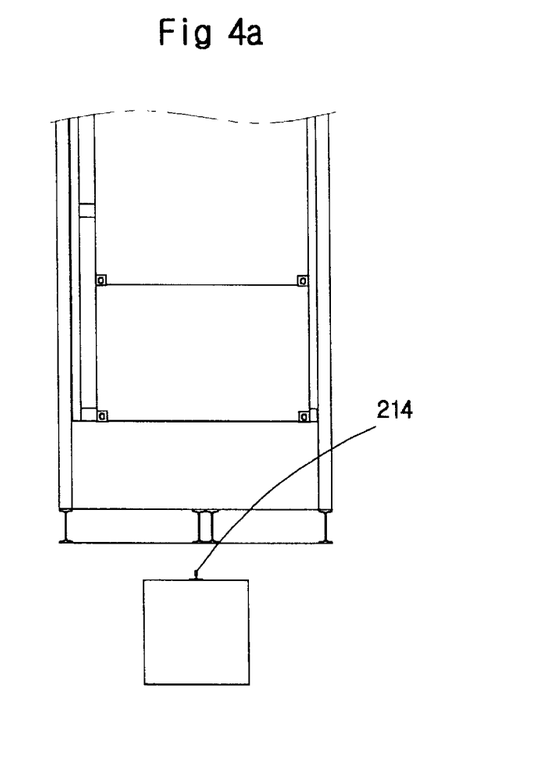
FIG. 4 is a view showing an elevator depicted in FIG. 3.
Figure 4B:
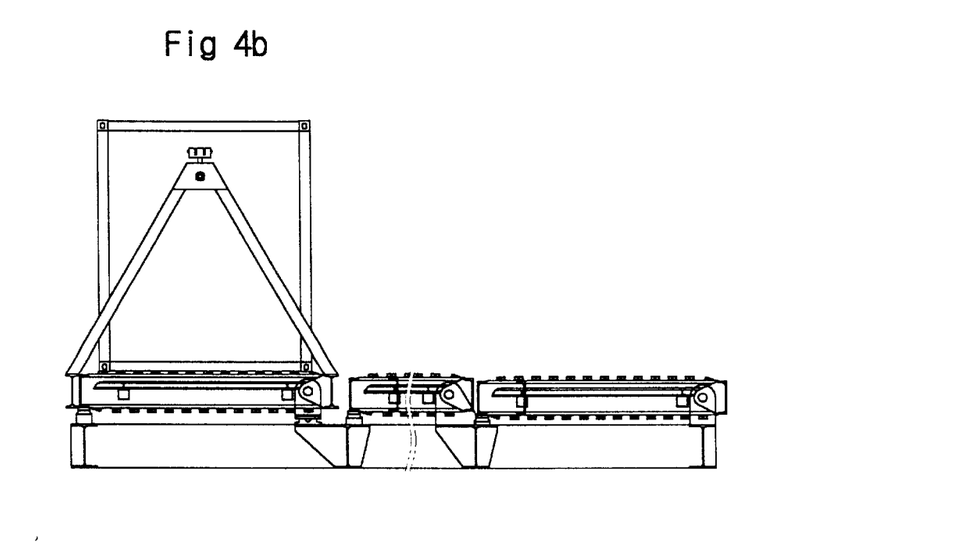
Figure 4C:
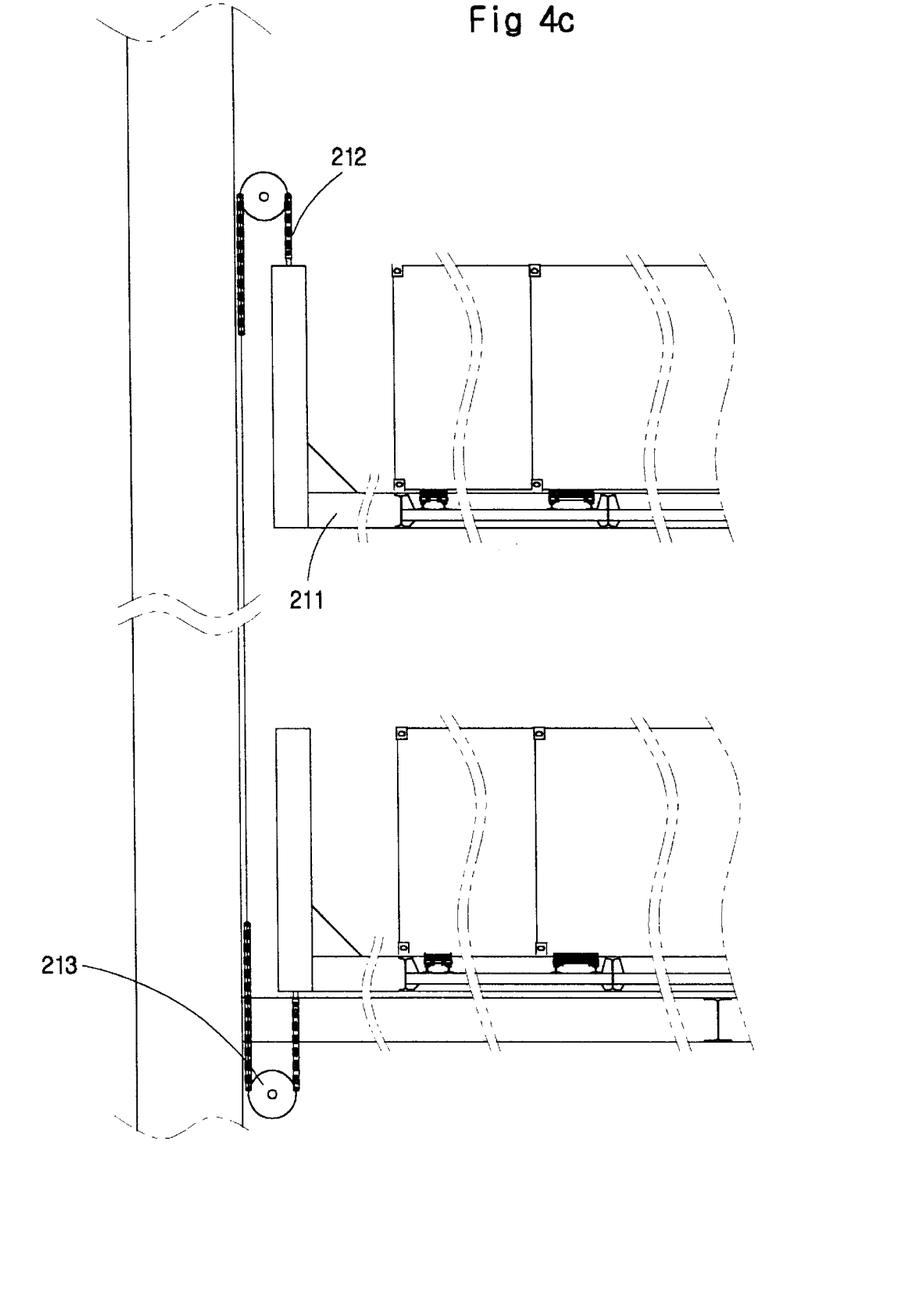

The conveying units 200 and 300 is in correspondence with the conveying units 70 and 72 shown in FIG. 3 and already described previously, and includes the elevator 70 for vertical elevating, and the conveyor 72. The elevator 70 of the conveying units 200 and 300 includes a pallet 211 for providing the above-mentioned ships conveying and loading position, a chain 212 for rising and falling the pallet 211 as shown in FIG. 4, a driving source 213 for operating the chain 212, and a guide post 214 for exactly guiding and supporting the rising and falling operation of the pallet 211. Here, while the detailed description thereof is omitted in the drawings, the size(height) of the ship and the loading height of the containers 40 loaded there at can depend on the continuous loading/unloading, whereby the risen height of the pallet 211 can be varied and adjusted by stages.

Figure 5A:
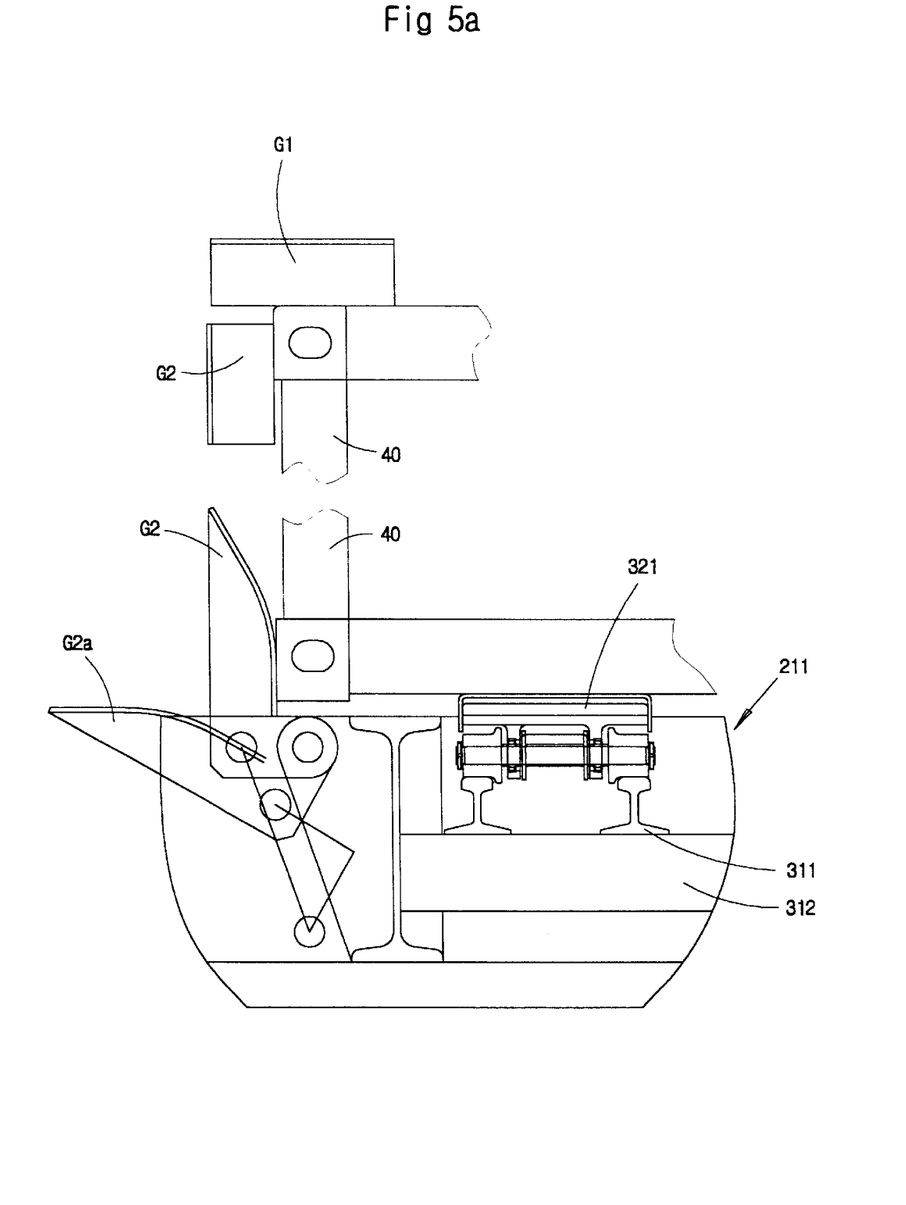
FIG. 5 is a view showing a container guide depicted in FIG. 3.
Figure 5B:
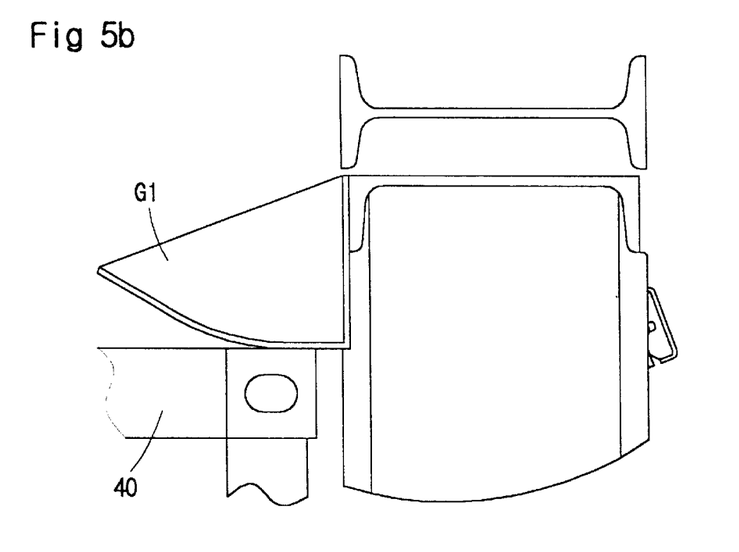
Figure 5C:
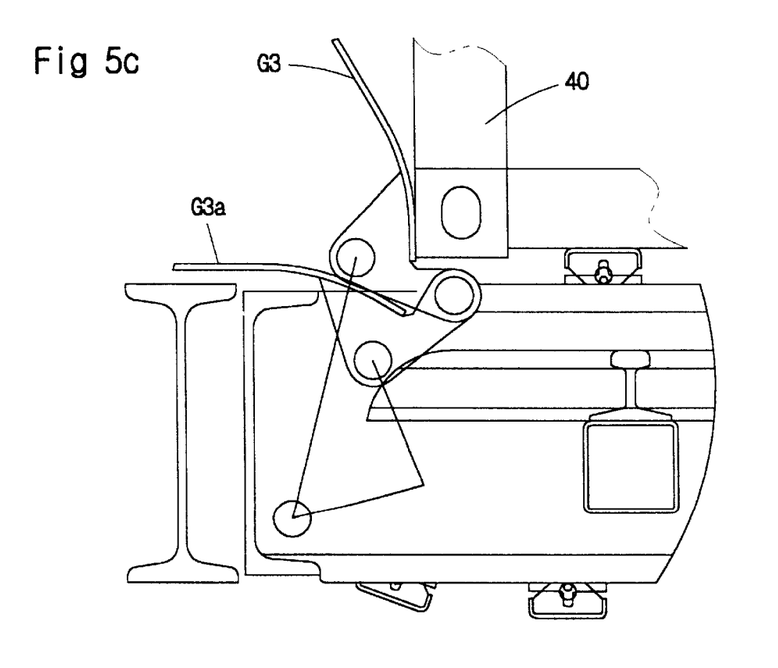
Figure 6:
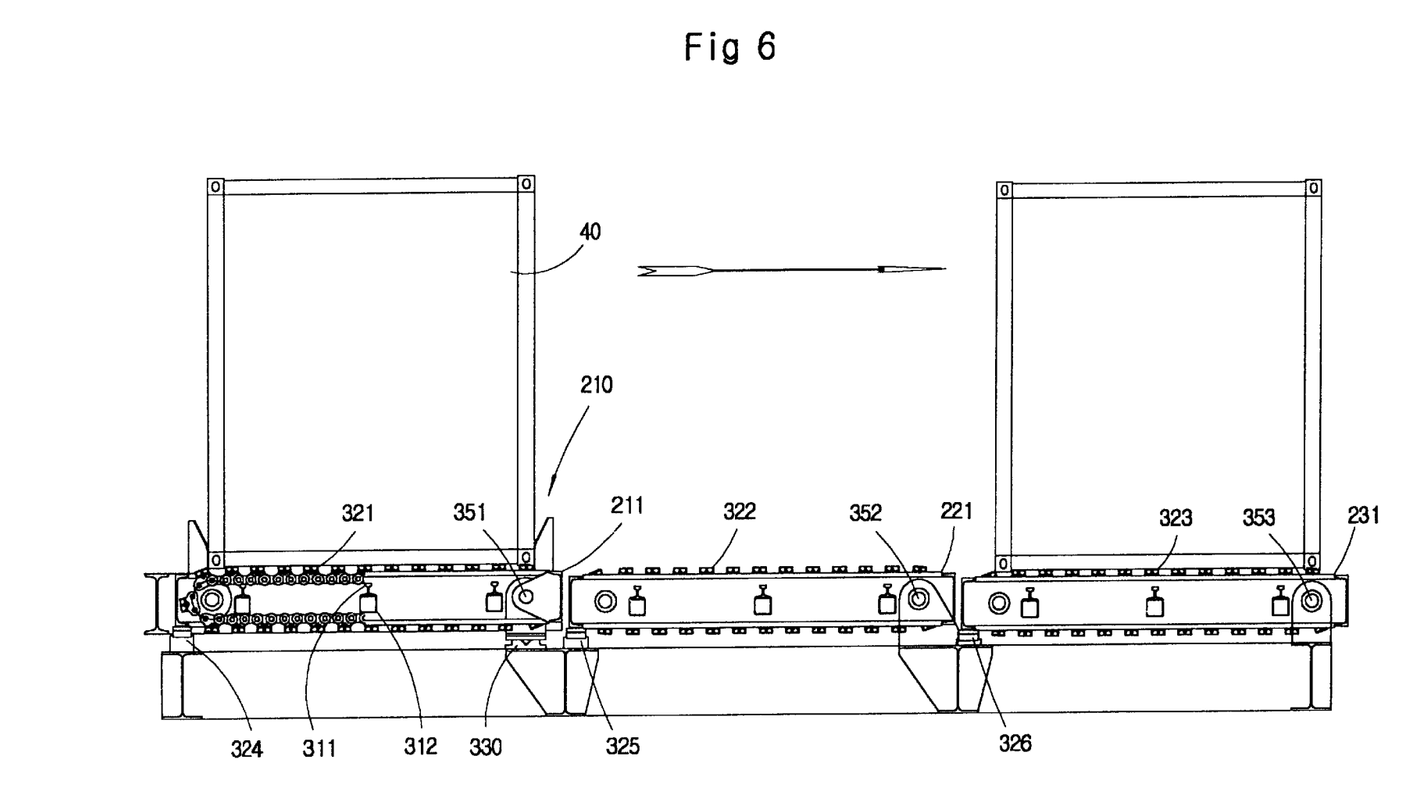
FIG. 6 is a view showing a conveyor depicted in FIG. 3.
Figure 7A:
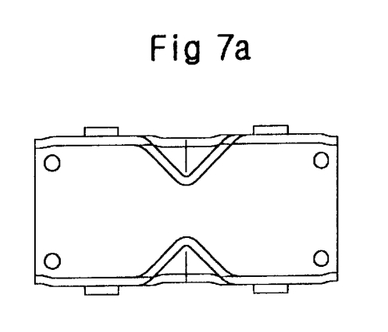
FIG. 7 is a detailed view showing the construction of a conveyor chain depicted in FIG. 3; and, FIG. 8 is a view showing the gantry crane depicted for a device for loading/unloading the cargo according to a second preferred embodiment of the present invention.
Figure 7B:
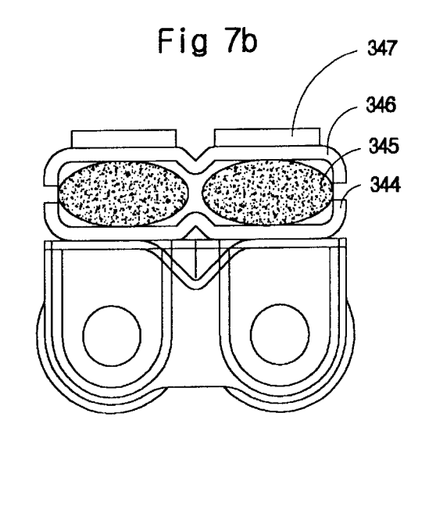
Figure 7C:
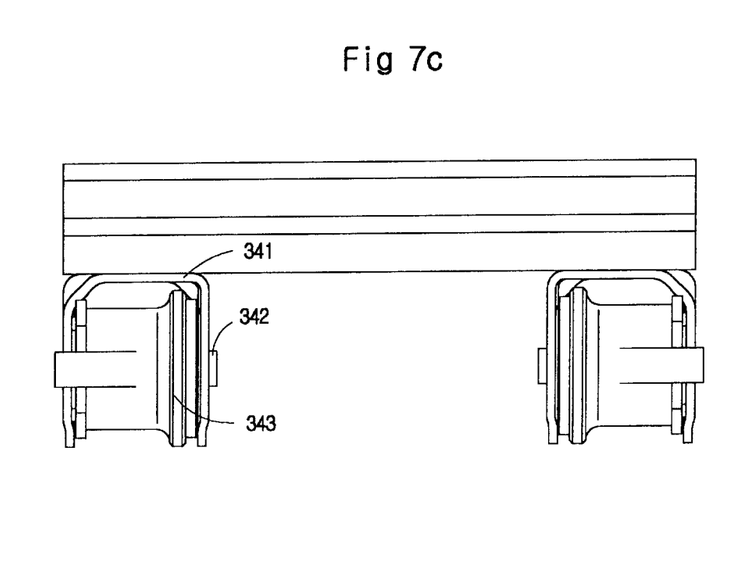

Upon unloading and conveying the container 40 of the conveying unit 300, container guide plates G2 and G3 of the conveyors 321, 322, and 323 as shown in FIGS. 5, 6, and 7, are open like container guide plates G'2 and G'3 so as to move the container 40 by a zig and a link as not show in figures when the pallet 211 falls down and determines its position at a position determining unit 330, in the event that the container 40 is loaded at the pallet 211 of the above elevator 210 along the container guide plates G1, G2, and G3. And then, a conveyor chain 321 makes the pallet 211 to be slant by rising a cylinder 324 by the central axis of the conveyor chain driving unit and driving axis 351, thereby improving the moving effect of the container 40. Also, the conveyor chain 321 of loading the container 40 has a frame 312 built at a regular interval, a rail 311 installed at the frame 312 and conveyor chains 344, 345, and 346 capable of rolling at the rail 311, wherein the conveyor chains 344, 345, and 346 have different width of a lower frame construction of an international common container 40 at a plurality of rows of the conveyor chain 321. Further, an elastic body 345 is sticked at the conveyor chain 321 to absorb the difference of the high and the low of the lower frame construction of the container 40, thereby uniformly dividing the load at the lower frame.

The trailer cargo conveying and loading unit 400 includes the lower guide rail 14 of the iron frame construction 10, an orthogonal coordinates frame crane 30 and the spreader 31 in order to move at the guide rail 14. Herein, the orthogonal coordinates frame crane 30 controls three axises positions with having direction orthogonal with the guide rail 14. The operating room 33 is separated from the orthogonal coordinates crane 30 and is installed at one posy 12 of the iron frame construction 10. In the operating room 33, the orthogonal coordinates crane 30 can be converted to manual operation and automatic operation at the operating room 33.

In an embodiment as constructed above, a step of unloading the container 40 loaded at the ship 50 is comprised of moving the trolly 20 of the ship cargo conveying and loading unit 100 to the position of the ship 50, loading the spreader 21 to the winch 22 at he position, lifting one of the containers 40 for unloading, and moving to the position of the elevator 210 of the conveying unit 200. At this event, while the pallet 211 of the elevator 210 is risen, the spreader 21 unloads the container 40 lifted at the pallet 211 and returns to the ship 50 for next ship unloading.

At the same of time, the conveying units 200 and 300 falls down the pallet 211 conveyed and loaded with the container with the operation of the chain 212 and the operation unit 213(driving source) 213 of the elevator 210, as illustrated in FIG. 4. When the pallet 211 fell down, the cylinder 324 as shown in FIG. 5 is risen, the driving unit and the driving axis are driven after making the conveyor chain 321 adhered at the pallet 211, and moves the container 40 to a direction of an arrow.

The container 40 moves in the case that the container 40 senses the sensor, not show, on coming into the pallet 211, the cylinder 325 is risen, the driving unit and the driving axis drive the container 40, and when the movement of the container 40 from the pallet 212 to pallet 212 is completed, the conveyor chain 321 is stoped and the pallet 211 is risen. At this point, the container 40 moves to the pallet 231. As stated hereinbefore, when the container 40 arrived at s final step of unloading and conveying the pallet, the orthogonal coordinates crane 30 and the spreader 231 of the trailer cargo conveying and loading unit 400 resultedly performs the unloading work for one of the containers 40, with lifting the container 40 and loading the lifted container 40 at the trailer 60 during awaiting.

Meantime, the trailer 60 loaded at the container 40 moves toward the designation place and the ship cargo conveying loading, unloading, and horizontal conveying steps are repeated during the trailer comes into, so that the unloading work of the container 40 is continuously performed.

According to a device of the present invention as described hereinabove, for example, even when coming of the trailer is delayed upon unloading work of the container, the unloading work of the container can be continued by the trolly 20 and the spreader 21 until filling the containers in the pallets 211, 221, and 231 having the temporal saving function and the conveying function.

Meanwhile, the above description is for the container unloading and the container loading is performed contrary to the above description.

That is, according to an embodiment of the present invention, the loading/unloading works at the harbor having same standard are discriminated thereby improving the loading/unloading work effect.

Figure 8:
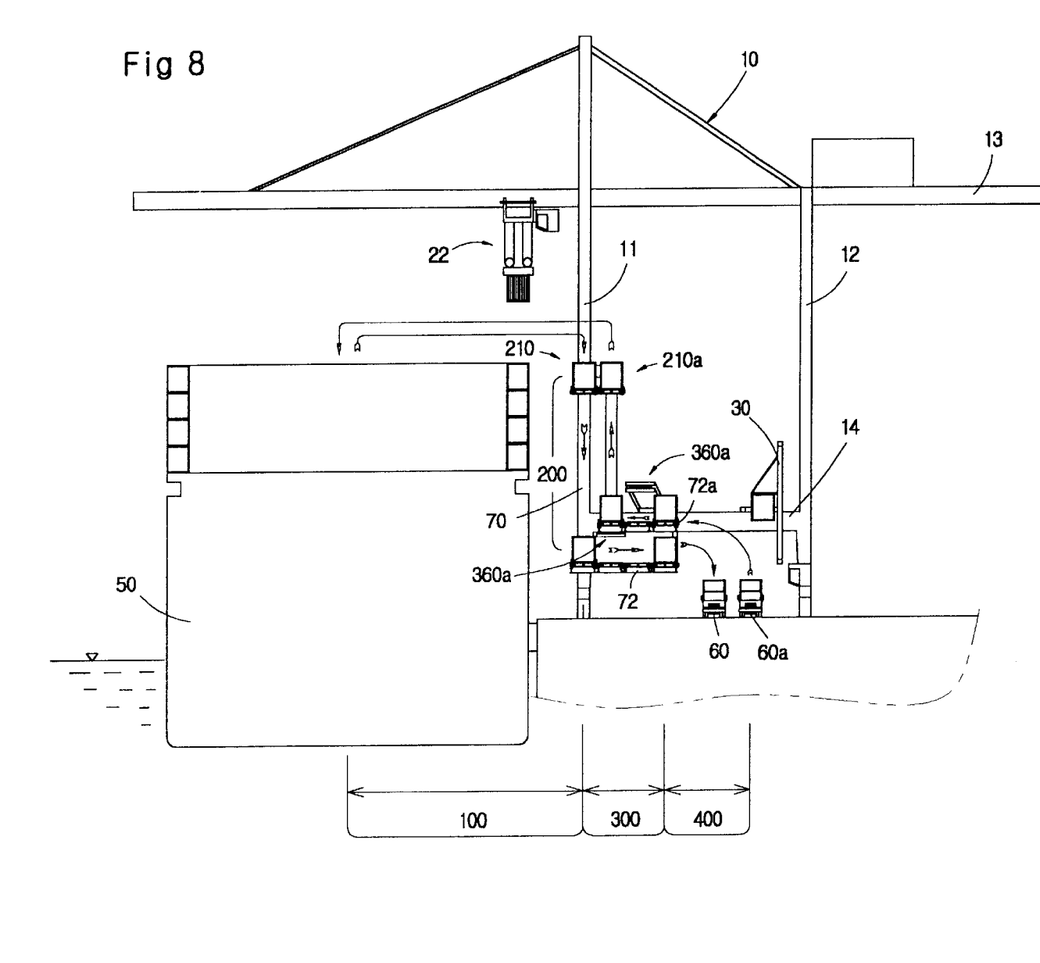

FIG. 8 is a view showing the gantry crane depicted for a device for loading/unloading the cargo according to a second preferred embodiment of the present invention. In FIG. 8, while the fundamental construction of the second embodiment thereof is equal to that as stated above, it includes a pocket for covering the container 40 at the conveyor 72 and 72*a* and the elevators 210 and 210*a* in the conveying units 200 and 300 and uses the middle conveying cranes 630 and 630*a* for moving the container 40 to the pocket.

As may be apparent from the foregoing, the present invention has an advantage in that the loading/unloading works of the container are simultaneously performed with discriminating the cranes(the trolly, the orthogonal coordinate crane, and the spreader) of lifting the heavy container (cargo) at the ship and the trailer.

Also, when the present invention is applied to the gantry crane as the main part of the harbor, since the conveying time of the container can be much reduced, other works is not delayed due to circumstance of one of the ship or the trailer, and the store in a warehousing and the delivery from warehouse smoothly proceeds to with no unnecessary waiting of the trailers, the loading/unloading works can be fastly performed.

Accordingly, the present invention can retrench the cost with improvement of the work efficiency reduction of the loading/unloading work time of the container in the harbour, and heightens the service efficiency of the harbor. Also, it complies the orthogonal coordinate crane to automatize the loading/unloading works at the trailer. Further, the sensor is included at the spreaders at two places, natural number(bar code, RF, IC ship) printed at the container is recognized, information of the container at the ship and harbor is received, error of the container unloading work be removed, the container can be rapidly and exactly conveyed and loaded at the regular position of ship yard, and yard efficiency are improved with effective loading at the yard.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for reducing time delays during loading and unloading of a cargo to a yard from a ship, the method comprising:

moving a container, between the ship and an elevator located in the yard adjacent the ship at a ship conveying position, using a trolley crane and a first spreader;

identifying properties of the cargo when moving the container between the ship and the ship conveying position;

moving the container vertically on the elevator between upper and lower positions, the lower position being adjacent a horizontal conveyor;

moving the container horizontally on the horizontal conveyor between the elevator and an orthogonal coordinates crane and second spreader adjacent a trailer in the yard, moving the container horizontally comprising tilting the container at a slant with a cylinder at the lower position of the elevator;

moving the container between the horizontal conveyor and the trailer using the orthogonal coordinates crane and second spreader; and sensing the position of the trailer and identifying properties of the cargo when moving the container between the horizontal conveyor and the trailer, whereby the steps of moving the container between the ship and elevator, moving the container vertically and moving the container horizontally can be done whether the trailer is present or missing.

2. A method according to claim 1, wherein moving the container horizontally and moving the container vertically are automated.

3. A method according to claim 1, wherein moving the container horizontally comprises conveying the container on a conveyor chain and uniformly distributing the load of the container such that damage to a lower frame of the container is minimized when the lower frame and conveyor chain make contact.

4. A system for reducing times delays when loading and unloading a ship to a trailer in a yard, the system comprising:

a trolley crane and spreader located over the ship for lifting a container from the ship to a ship conveying position in the yard;

an elevator located at the ship conveying position;

a horizontal conveyor having a first end at a lower end of the elevator and a second end adjacent the trailer, the first end of the horizontal conveyor comprising a cylinder for tilting a conveyor chain of the horizontal conveyor;

an orthogonal coordinates crane and spreader located over the second end and trailer for lifting the container between the second end and trailer; and sensing means on each spreader for identifying properties of the container from an identifier on the container.

5. A system according to claim 4, wherein the trolley crane and spreader and the orthogonal coordinates crane and spreader are mounted to upper and lower rails, respectively, of a support frame.

6. A system according to claim 4, wherein the elevator and horizontal conveyor are automated.

* * * * *